United States Patent [19]

Kopchik

[11] Patent Number: 4,742,123

[45] Date of Patent: May 3, 1988

[54] THERMOPLASTIC NON-CROSSLINKED POLYMERS, IMIDE POLYMERS, AND PROCESS FOR PREPARATION

[75] Inventor: Richard M. Kopchik, Southampton, Pa.

[73] Assignee: Rohm and Haas Co., Philadelphia, Pa.

[21] Appl. No.: 941,572

[22] Filed: Dec. 11, 1986

Related U.S. Application Data

[63] Continuation of Ser. No. 858,527, Apr. 23, 1986, abandoned, which is a continuation of Ser. No. 484,719, Apr. 13, 1983, abandoned, which is a continuation of Ser. No. 309,298, Oct. 7, 1981, abandoned.

[51] Int. Cl.$^4$ .............................................. C08F 20/66
[52] U.S. Cl. ................................................. 525/329.7
[58] Field of Search ..................................... 525/329.7

[56] References Cited

U.S. PATENT DOCUMENTS 3,137,660  6/1964  Jones .................................... 260/2.2

*Primary Examiner*—Paul R. Michl
*Assistant Examiner*—Patrick A. Doody

[57] ABSTRACT

Thermoplastic, non-crosslinked polymer compositions having glutaric anhydride units of the formula:

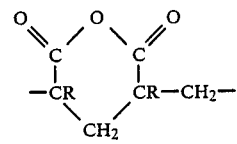

wherein R represents $CH_3$ or H, process for imidizing said compositions, the resultant imide polymers which are free of methyl imide units, and process of devolatilizing an acrylic or methacrylic acid-containing polymer in an extruder to the corresponding anhydride, and then introducing a reactant selected from the group consisting of ammonia, ammonia generators, primary amine, and primary amine generators.

11 Claims, No Drawings

THERMOPLASTIC NON-CROSSLINKED POLYMERS, IMIDE POLYMERS, AND PROCESS FOR PREPARATION

This application is a continuation of application Ser. No. 858,527 filed Apr. 23, 1986, which is in turn a continuation of application Ser. No. 484,719, filed Apr. 3, 1983, which is in turn a continuation of application Ser. No. 309,298, filed Oct. 7, 1981, all now abandoned.

BACKGROUND OF THE INVENTION

1. Field of the Invention

This invention relates to glutaric anhydride polymers, imide polymers produced therefrom, and to processes for producing said polymers in an extruder.

2. Description of Prior Art

In my U.S. Pat. No. 4,246,374 of Jan. 20, 1981, I disclose polymers containing imide units of any desired degree of imidization without the use of added water or solvent, using an extruder and feeding polymers containing units derived from esters of acrylic or methacrylic acid.

Others, D. H. Grant et al, Polymer 1, 125 (1960), for example, disclose preparation of polyglutaric anhydride which is shown as being crosslinked and hence would be insoluble in dimethyl formamide ("DMF"), would not be processable, and would not be injection moldable.

J. C. Hwa et al, Am. Chem. Soc., Div. Polymer Chem., Preprints, 4, (1), 56 (1963), and A. Crawshaw and S. B. Butler, J. Am. Chem. Soc., 80, 5464 (1958), show uncrosslinked polyglutaric anhydride, not soluble in DMF, but rather is only swellable in DMF, and is not thermally stable; its onset of decomposition temperature is only 172°–175° C., and thus it would not be considered to be a processable product.

Graves, U.S. Pat. No. 2,146,209, discloses urea as a source of ammonia, and shows going directly from an acid to an imide, though not through the glutaric anhydride, and not in an extruder.

Schroeder, U.S. Pat. Nos. 3,244,679 and 3,284,425 show autoclave processes requiring lengthy heating time in the presence of inert dissolving or suspending solvent.

See also the prior art disclosed in my prior patent.

In spite of all of the prior work in this area, no one has been able to make a non-crosslinked anhydride polymer in a way which produced thermoformable, yet highly thermally stable and processable product. Furthermore, no one has been able to make the corresponding imide polymers free of methyl substitution and thermally stable.

SUMMARY OF THE INVENTION

It is to prepare anhydride polymers which are thermoformable, highly thermally stable, and processable.

Another object is to prepare an anhydride polymer useful for making the corresponding imide polymers.

Another object is to make improved imide polymers free of methyl substitution from the corresponding anhydride polymers.

These objects, and others as well become apparent from the following disclosure are achieved by the present invention which comprises thermoplastic, non-crosslinked polymer compositions having units of the structural formula:

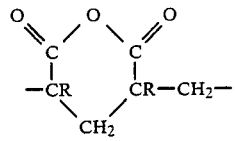

wherein R represents $CH_3$ or H, said polymer composition being soluble in dimethyl formamide, having thermal stability as defined by an onset of decomposition temperature of at least 250° C., and processability as defined by a Vicat temperature of 50° C. to 175° C., said Vicat temperature being at least about 75° C. below said onset of decomposition temperature.

In another aspect, the invention comprises a process of imidizing the polymer compositions in an extruder with a reactant selected from the group consisting of ammonia, ammonia generators, and primary amine. The resultant imide polymers, free of methyl imide units, are also part of the invention.

The invention also comprises preparing the imide polymers by devolatilizing an acrylic or methacrylic acid-containing polymer in an extruder and then introducing at a downstream vent port a reactant selected from the group consisting of ammonia, ammonia generators, and primary amine.

DETAILED DESCRIPTION OF THE INVENTION AND THE PREFERRED EMBODIMENTS

The glutaric anhydride-containing polymers of the invention are non-crosslinked, thermoformable and yet highly thermally stable, processable, and injection moldable, so that they can be used as engineering plastics. The polymers are soluble in DMF, have thermal stability as defined by an onset of decomposition temperature of at least 250° C., and processability as defined by a Vicat temperature of at least about 75° C. below the onset of decomposition temperature.

The glutaric anhydride polymers are prepared in an extruder by introducing an acrylic acid or methacrylic acid-containing polymer either as granules or as a solution in monomer and/or solvent, preferably maintaining a temperature of about 200°–300° C., and applying negative pressure at a vent port so as to devolatilize, removing water. The anhydride can be easily prepared without catalyst, and none is preferred; however, metal catalysts which promote anhydride formation can be used in some situations.

The acid-containing polymer can be a homopolymer of methacrylic acid or acrylic acid, or it can be a copolymer of one or both acids with one or more other ethylenically unsaturated monomers. The other ethylenically unsaturated monomers can be any which are copolymerizable with the acids such as, for example, styrene, substituted styrenes, such as bromostyrene, chlorostyrene, etc., olefins such as ethylene, propylene, and the like, salts of acrylic and methacrylic acids such as calcium and sodium salts, esters of acrylic and methacrylic acids such as methyl acrylate, ethyl acrylate, butyl acrylate, ethyl methacrylate, butyl methacrylate, isobutyl methacrylate, isodecyl methacrylate, auryl methacrylate, steryl methacrylate, 2-hydroxyethyl methacrylate, hydroxypropyl methacrylate, dimethylaminoethyl methacrylate, 2-bromoethyl methacrylate, 2-bromoethyl acrylate, cyclohexyl methacrylate, cyclohexyl acrylate, and the like. Also, salts, esters, ethers and amides of allyl alcohol and vinyl alcohol such as allyl ether, allyl chloride, allyl alcohol itself, vinyl chloride, vinyl acetate, allyl bromide, allyl acetate, n-methyl methacrylamide, n-butyl acrylamide, and the like. Also, vinyl pyridine, vinyl benzoate, vinyl chloroacetate, vinyl decyl ether, 2-methoxyethyl vinyl ether, vinyl toluene, vinyl-n-propyl ether, vinyl bromide, vinyl fluoride, vinylidene chloride, vinylidene fluoride, and the like.

The preferred acid polymer compositions contain at least about 50% units derived from acrylic or methacrylic acid, preferably at least 70%, and more preferably about 80 to 90% of such units. The comonomers which are preferred are styrene or ethylene, preferably about 5 to 20% of the units, and methyl methacrylate, about 1 to 10% of the units. Among the two acids, methacrylic is preferred.

The acid-containing polymer is prepared by conventional solution, suspension, or bulk cast processes, and can be continuously produced and introduced to the devolatilizing extruder to continuously produce the glutaric anhydride polymer. As mentioned, the acid-containing polymer can be introduced as granules ("dry feed") or as a solution in monomer ("wet feed").

The same extruder can be used to prepare the glutaric anhydride and to prepare the imide polymer from it; or separate extruders can be used. The extruder must be one which has good devolatilization characteristics such as those made by Welding Engineers, American Liestritz, or Werner-Pfliederer.

The imide polymer is prepared from the anhydride polymer by introducing at an addition port ammonia, an ammonia generator, a primary amine, or a primary amine generator in any way similar to that of my earlier patent mentioned above. However, I have found that a much lower pressure can be used in the present process to prepare the corresponding imide polymer, and the product is more uniform. A particular advantage in that imide polymers which are free of methyl-substituted imides can be prepared from ammonia or ammonia generators. This could not be done in the previous process due to side reactions.

The low pressures which were referred to above are about 100 to 300 psi, with as low as 200 psi preferred. In practice, the previous process typically required about 500 to 2,000 psi.

The temperature must be kept high enough to transport the imide, typically about 200° to 300° C., and one or more vents must be kept at negative pressure to remove unreacted ammonia or primary amine.

The ammonia generators can be urea, substituted urea, formamides, or an aqueous solution of ammonia, and can be in liquid or solid form.

The amine generator can be 1,4-dimethylurea. The amine can be methyl amine, or any of a wide variety as more fully disclosed in my previous patent.

The ammonia generators, or primary amine are preferably added in sufficient excess so as to completely imidize the glutaric anhydride polymer. A stoichiometric excess of 5 to 20% of the amine or ammonium reagent is adequate in most cases for essentially total conversion of the anhydride units to imide units.

The imide polymers so produced have utility as engineering plastics. These polymers can have a balance of high service temperature, good thermal stability, processability, high strength, and high modulus which makes them ideal for use as engineering plastics where strength properties under harsh use conditions for long periods of time are important. For example, as polymers for "under the hood" automotive applications, for use as structural parts of electric motor housings, and for components of high performance aircraft. Various additives and modifiers can be employed in the imide composition as more fully described in my previous patent.

To illustrate the invention further, the following non-limiting examples are presented. All parts and percentages are by weight unless otherwise indicated.

EXAMPLE 1

A polymer solution containing 40 weight percent of a copolymer of 86% methacrylic acid (MAA) and 14% styrene (S) at 150° C. was added at 200 psig to the feed port of a counter rotating tangential twin screw extruder. This solution was added at a rate of 80 g/min. This solution was conveyed down the barrel of the extruder through a devolatilization zone at atmospheric pressure and then a devolatilization zone at 25 inches of mercury of vacuum. Each of these zones being 12 barrel diameters long (9.6 inches). At the end of these two devolatilization zones the polymer was almost free of liquids (residual volatiles less than ½ weight percent) and most adjacent MAA groups had combined to form six member anhydride units. The resulting water was removed with the solvents in the devolatilization zone. In a liquid addition zone a solution of 50% urea in water was added to the anhydride polymer melt. This material was well mixed into the polymer melt and reacted to transform the anhydride units to imide units. After leaving the reaction zone, which was 24 barrel diameters in length (19.2 inches) the water and other liquids and vapors were removed in a devolatilization zone, 12 barrel diameter long (9.6 inches) kept at 25 inches of mercury of vacuum. The resulting polymer then left the extruder through a strand die, was cooled and then pelletized. The product from this process was collected at 32 g/min. The resulting polymer had a nitrogen content of 5.79% and a composition of methacrylic acid/styrene/methacrylimide (23/14/63). This material had a Vicat temperature of 195° C., was soluble in DMF, had a 1% decomposition temperature (in nitrogen) of 350° C., and a melt flow rate (condition modified C) of 20.

EXAMPLE 2

As described in example 1 thru the second devolatilization zone. At the end of this zone the anhydride polymer left the extruder through a strand die. The resulting polymer was soluble in DMF, had a 1% decomposition temperature (in nitrogen) of 340° C. and a Vicat temperature of 163° C. The IR spectrum showed the two bands at 1800 and 1758 cm$^{-1}$ characteristic of the six membered ring anhydride from polymethacrylic acid (D. H. Grant and N. Grassie, Polymer 1, 125 (1960).

EXAMPLE 3

The polymer from example 2 was fed into the solid feed port of a counter rotating tangential twin screw extruder. The polymer passed from the melt down zone into a reaction zone where it was mixed with a 50 weight percent solution of urea in water added through a liquid addition port. This reaction zone was 24 barrel diameters in length (19.2 inches). The polymer was transported from the reaction zone into a devolatilization zone which was 12 barrel diameter (9.6 inches) long. In this zone the polymer was exposed to a vacuum of 25 inches of mercury. The water and other vapors were removed from the polymer melt at a temperature of 325° C. The polymer then left the extruder through a strand die. The polymer produced was identical to that produced in example 1.

EXAMPLE 4

Polymethacrylic acid with a molecular weight of 150,000 in a finely divided form was added to the feed part of a twin screw extruder. This polymer was converted to a melt and conveyed into a series of two devolatilization zones; the first of which was at atmospheric pressure and the second of which was at 28 inches of mercury vacuum. In these zones a chemical reaction took place in which adjacent acid groups formed six member cyclic anhydrides. The resulting water was removed from the melt in the devolatilization zone. The polymeric anhydride was carried into a reaction zone where it was mixed with a water solution of ammonia, which was added through a liquid addition port at 280 psig. The resulting mixture was conveyed through a reaction zone 18 barrel diameters in length (14.4 inches). In this zone the anhydride units were converted to six membered cyclic imide units. In a final devolatilization zone the volatile materials in the melt were removed with a vacuum of 28 inches of mercury. The resulting imide polymer left the extruder through a strand die. This polymer was soluble n DMF, had a 1% decomposition temperature (in nitrogen) of 350° C., a Vicat temperature of 235° C., and a melt flow rate (condition modified C) of 10.

EXAMPLE 5

As described in example 4 thru the second devolatilization zone. At the end of this zone the anhydride polymer left the extruder. The resulting polymer was soluble in DMF, had a 1% decomposition temperature (in nitrogen) of 335° C., a Vicat temperature temperature of 166° C., and a melt flow rate (condition modified C) of 40.

EXAMPLE 6

The polymer from example 5 was fed into the solid feed port of a twin screw extruder. The polymer melt was transported into a 18 barrel diameter (14.4 inches) reaction zone in which it was mixed with a solution of ammonia in water. The resulting polymer was extruded at 32 g/min. to give a polymer identical with that from example 4.

EXAMPLES 6 THRU 33

A polymer solution was fed into the pressurized feed port of a twin screw extruder. This solution was devolatilized in a two section devolatilization zone (at 1 atmosphere and at 28 inches of mercury vacuum). A reactive feed was then mixed with the resulting anhydride polymer in a reaction zone. The product imide was then devolatilized with a vacuum vent and the resulting polymer extruded through a strand die.

| | Polymer Feed | | |
|---|---|---|---|
| Example No. | Monomer Unit | Composition of Polymer | Reactive Liquid Feed |
| 6 | MMA/S | 98/2 | urea/water |
| 7 | MAA/S | 70/30 | " |
| 8 | MAA/AA | 80/20 | " |
| 9 | MAA/E | 95/5 | " |
| 10 | MAA/AA/S | 90/5/5 | " |
| 11 | MAA/MMA | 85/15 | " |
| 12 | MAA/MMA/S | 80/10/10 | " |
| 13 | MAA/EA | 85/15 | " |
| 14 | MAA/AA | 20/80 | " |
| 15 | MAA | 100 | " |
| 16 | AA/MMA/S | 80/10/10 | " |
| 17 | MAA | 100 | ammonia in water |
| 18 | MAA/MMA/S | 85/5/10 | ammonia in water |
| 19 | MAA | 100 | anhydrous ammonia |
| 20 | MAA/S | 95/5 | anhydrous ammonia |
| 21 | MAA/S | 95/5 | formamide |
| 22 | MAA/MMA/S | 85/5/10 | methylamine in water |
| 23 | MAA | 100 | methylamine in water |
| 24 | MAA | 100 | anhydrous methylamine |
| 25 | MAA/S | 95/5 | anhydrous methylamine |
| 26 | MAA/E | 95/5 | methylamine in acetone |
| 27 | MAA/AA/S | 80/10/10 | 1,4-dimethyl-urea in water |
| 28 | MMA/S | 95/5 | n-butylamine |
| 29 | " | " | n-dodecyl-amine |
| 30 | " | " | cyclohexyl-amine |
| 31 | " | " | aniline |
| 32 | " | " | allylamine |
| 33 | " | " | 1-amino-2-dimethylamino ethane |

For examples 6 thru 27 the resulting polymer was found to have over 75% of adjacent acid pairs (MAA or AA) converted to the six member cyclic imide structure, to be soluble in DMF, to have a 1% weight loss temperature in air of greater than 285° C., a melt flow rate (condition modified C) of between 50 and 1, and a Vicat temperature of over 150° C.

For examples 6 thru 21 the imide unit present in the polymer is unsubstituted. (There is a hydrogen on the nitrogen atom.)

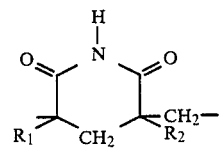

For examples 22 thru 27 the imide unit present in the polymer is methyl substituted (there is a methyl group on the nitrogen atom.)

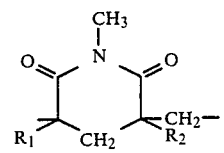

For examples 28 thru 33 the resulting polymers had over 50% of the anhydride units converted to imide units, were soluble in DMF, and had a 1% weight loss temperature in air of greater than 285° C.

The Vicat temperature of examples 28 thru 33 were

|    | Vicat Temperature |
|----|-------------------|
| 28 | 100° C.           |
| 29 | Less than 20° C.  |
| 30 | 200° C.           |
| 31 | 240° C.           |
| 32 | 195° C.           |
| 33 | 180° C.           |

In example 33 great care had to be taken to remove the trace amounts of 1,2-diamino ethane from the 1-amino-2-dimethylamino ethane. If this was not done the trace amount of the diprimary amine resulted in cross-linking in the extruder.

I claim:

1. Thermoplastic, non-crosslinked polymer compositions having a glutaric anhydride units of the formula

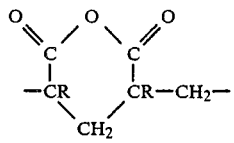

wherein R represents $CH_3$ or H, said polymer composition being soluble in dimethyl formamide, having thermal stability as defined by an onset of decomposition temperature of at least 250° C., and processability as defined by a Vicat temperature of 50° C. to 175° C., said Vicat temperature being at least 75° C. below said onset of decomposition temperature.

2. Composition of claim 1 wherein said polymer also contains repeating units derived from one or more ethylenically unsaturated monomers.

3. Composition of claim 2 wherein said monomers are selected from the group consisting of styrene, ethylene, and methyl methacrylate.

4. Composition of claim 2 wherein said repeating units comprise about 1 to 100% of said polymer.

5. Composition of claim 1 wherein said polymer composition contains about 80 to 90% units of said structural formula, about 5 to 20% units derived from styrene, and about 1 to 10% units derived from methacrylic acid.

6. Method of producing polymer compositions of claim 1 comprising devolatilizing an acrylic acid or methacrylic acid-containing polymer in an extruder to form the anhydride.

7. Process of imidizing the polymer compositions of claim 1 to form a polymer containing imide units free of methyl groups substituted on the nitrogen atom comprising reacting said polymer compositions in an extruder at low pressures of about 100 psi to about 300 psi with a reactant selected from the group consisting of ammonia, and ammonia generators.

8. Process of claim 7 wherein said ammonia generators are urea, substituted urea, formamides, or an aqueous solution of ammonia.

9. Process of claim 7 using an ammonia generator in solid form as the reactant.

10. The thermoplastic, non-crosslinked polymer composition of claim 2 comprising about 1 to 100% of said glutaric anhydride units plus said repeating units derived from one or more ethylenically unsaturated monomers.

11. The thermoplastic, non-crosslinked polymer composition of claim 2 comprising about 1 to about 100% of said glutaric anhydride units plus said repeating units derived from one or more ethylenically unsaturated monomers.

* * * * *